Nov. 8, 1927.                                                1,648,733
V. KARAPETOFF
CALCULATOR
Filed Oct. 25, 1924                          4 Sheets-Sheet 1

Inventor:
Vladimir Karapetoff,
by Alexander S. [illegible]
His Attorney.

Nov. 8, 1927.

V. KARAPETOFF

CALCULATOR

Filed Oct. 25, 1924

1,648,733

4 Sheets-Sheet 2

Inventor:
Vladimir Karapetoff,
by
His Attorney.

Nov. 8, 1927.

V. KARAPETOFF

CALCULATOR

Filed Oct. 25, 1924  4 Sheets-Sheet 4

Inventor:
Vladimir Karapetoff,
by Alexander S. Lentz
His Attorney,

Patented Nov. 8, 1927.

1,648,733

UNITED STATES PATENT OFFICE.

VLADIMIR KARAPETOFF, OF ITHACA, NEW YORK, ASSIGNOR TO GENERAL ELECTRIC COMPANY, A CORPORATION OF NEW YORK.

CALCULATOR.

Application filed October 25, 1924. Serial No. 745,896.

My invention relates to a calculator for determining characteristics of synchronous alternating current machines. Builders and users of synchronous alternating current machines oftentimes desire to determine various characteristics of such machines such for example as the voltage-current characteristics, the relation of power factor, field excitation, power displacement angle, etc. To determine such characteristics by ordinary mathematical calculation, or actual measurement, is both laborious and expensive. It is the object of my invention to provide a calculating device by means of which various related characteristics of such machines may be quickly and accurately determined from the no load saturation curve of the machine in question.

In general, the device embodying my invention comprises a power factor protractor, an indicating arm pivoted at the center of the protractor representative of the direction of the armature current vector, a proportionate divider preferably adjustably secured to the indicator arm, a field excitation scale pivotally secured to the free end of the proportionate divider, and a terminal voltage scale secured in fixed relation to the protractor scale. This calculating device is used by placing it on the no load saturation curve of the machine in question and adjusting its parts with respect to the curve in the manner hereinafter described, after which the desired values or relations may be determined from the various scale readings.

Figure 1:
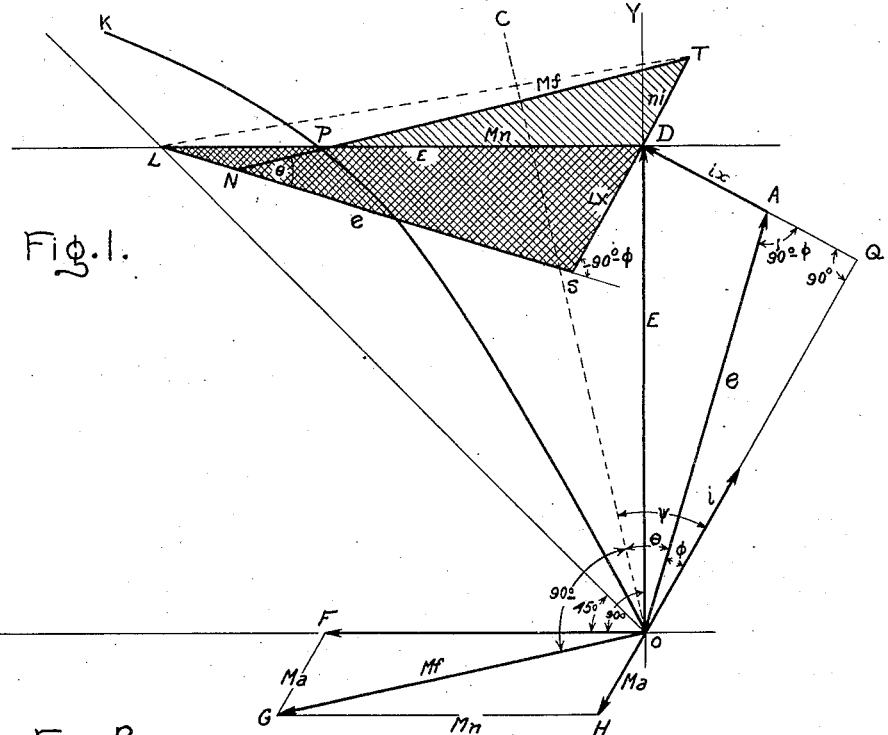
Figure 2:
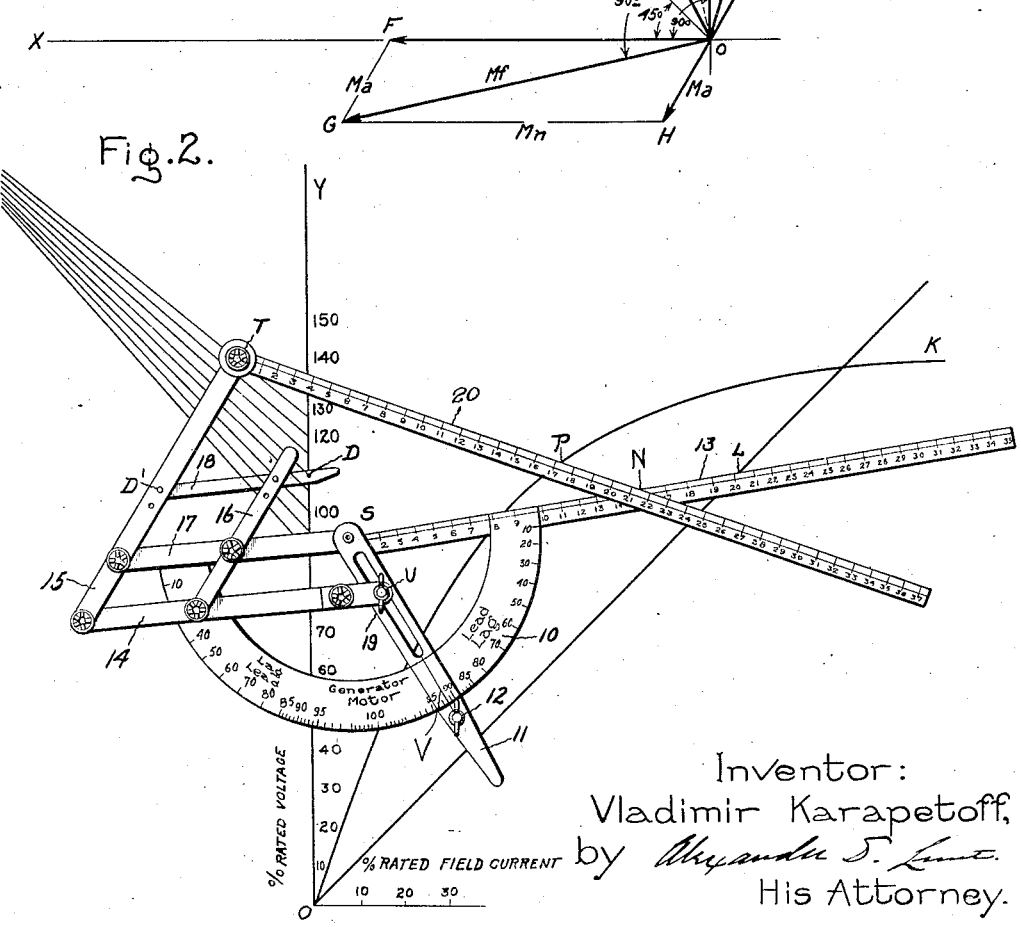
Figure 3:
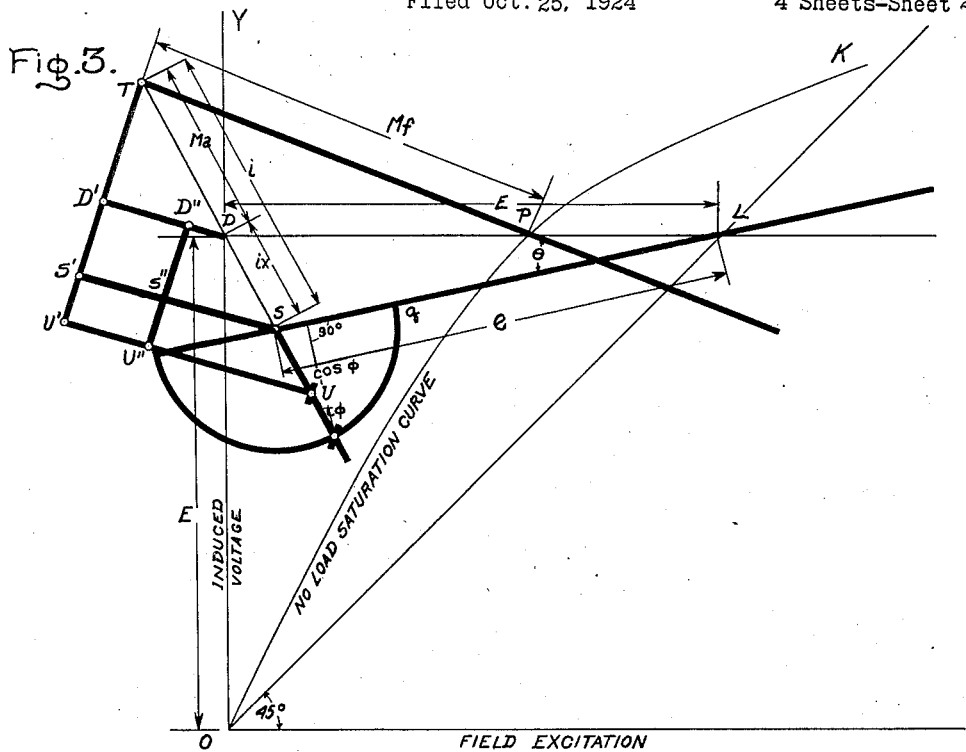
Figure 4:
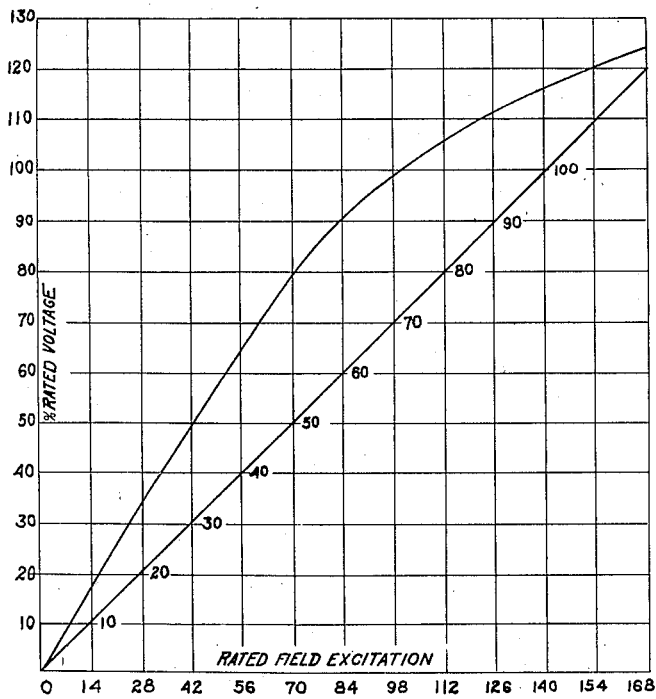
Figure 5:
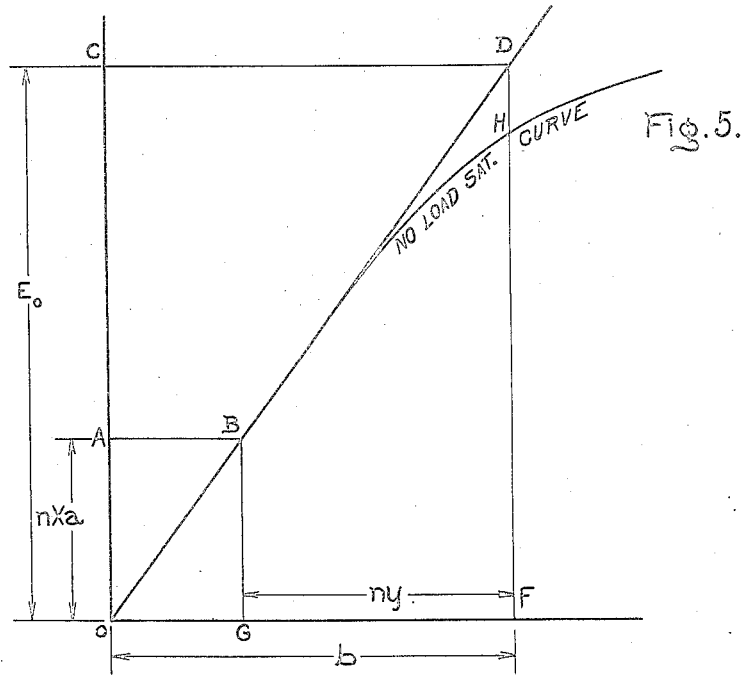
Figure 6:
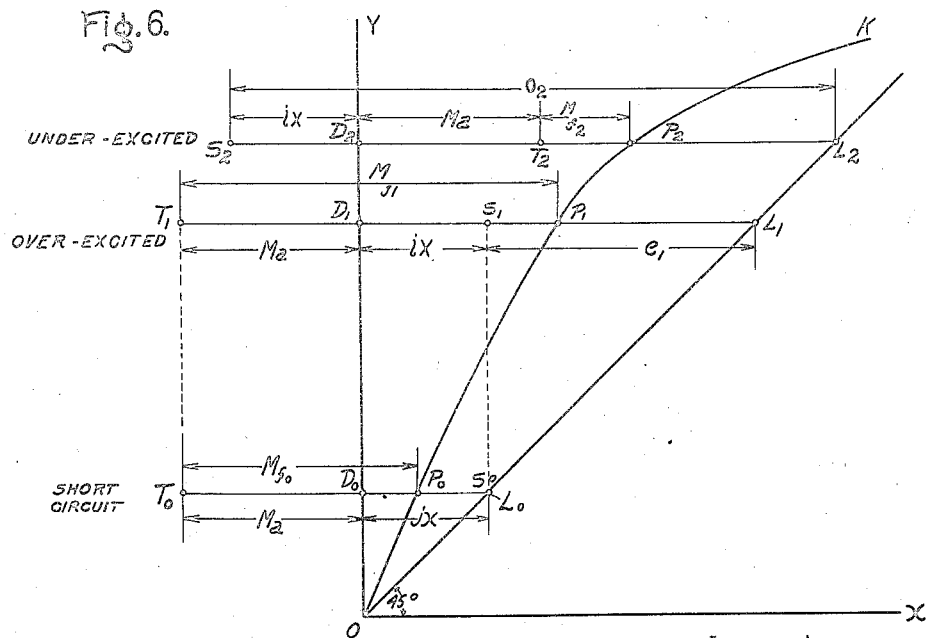
Figure 7:
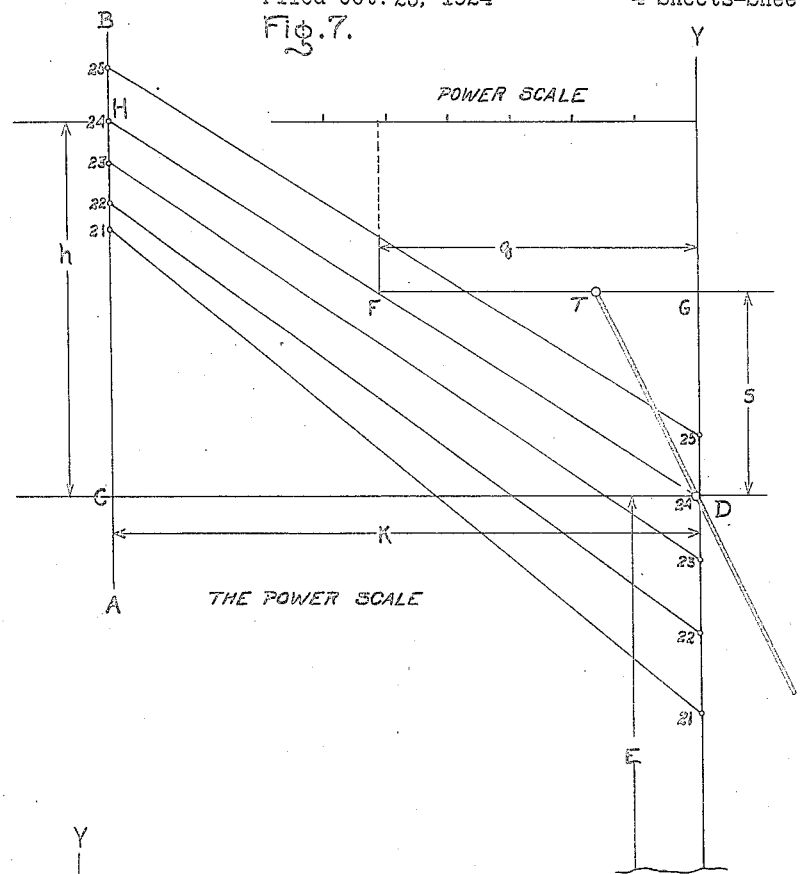
Figure 8:
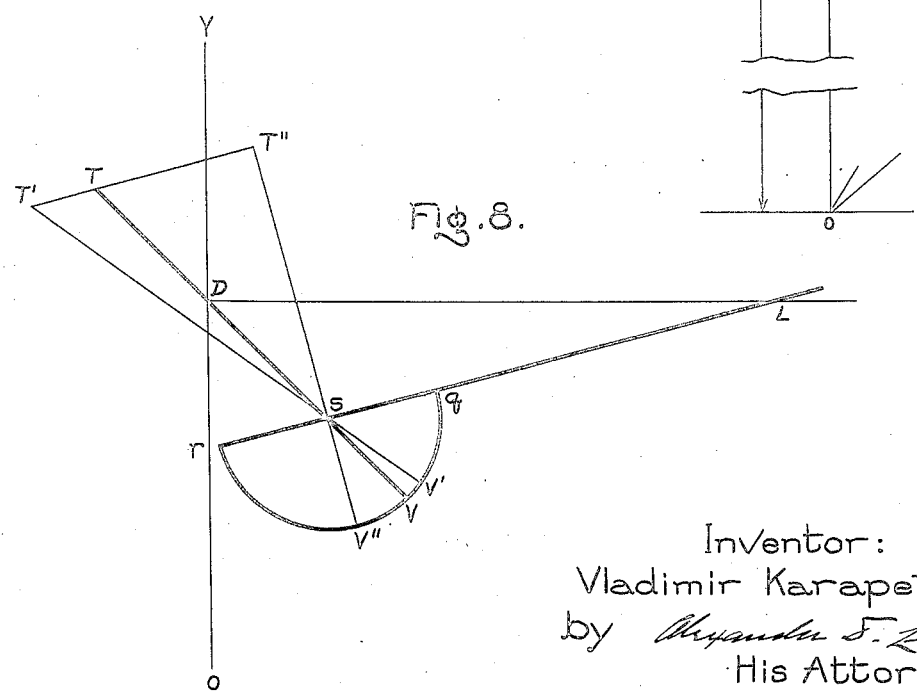

The features of my invention which are believed to be novel and patentable will be pointed out in the claims appended hereto. For a better understanding of my invention, reference is made in the following description to the accompanying drawings wherein Fig. 1 is a vector diagram explanatory of the theory upon which the calculating device is based; Fig. 2 illustrates one form of the calculating device and the manner of placing it on the saturation curve; Fig. 3 is a diagrammatic single line representation of the device to be referred to; Fig. 4 is a no load saturation curve to be referred to in explaining the proper setting of the calculating device under certain conditions; Fig. 5 is a diagram showing the scale relationship for determining short circuit conditions; Fig. 6 illustrates the scale settings for a zero power factor condition; Fig. 7 is a diagram explanatory of the power scale; and Fig. 8 is a diagram explanatory of the scale setting when reactance or capacity is placed across the terminals of the machine under investigation.

The theory upon which my calculating device is based will now be explained in connection with the vector diagram represented in Fig. 1. This diagram is in general similar to that shown on page 145 of my book entitled "The Magnetic Circuit". This diagram is known as the Potier diagram and is vectorally respresentative of the performance of a synchronous machine as more fully explained in the book above referred to. In this diagram, $i$ represents the armature current vector, and $OA=e$ represents the corresponding terminal voltage vector neglecting resistance drop in the armature. The phase angle between the two is $\phi$. The terminal voltage OA plus the reactive drop $AD=ix$ in leading quadrature with $i$, gives the induced voltage $OD=E$. The direction of the vector of this voltage is taken as the Y axis. In the space diagram of magnetomotive forces, the axis OX is the direction of the net magnetomotive force $OF=Mn$ drawn at right angles to E. The relationship between E and $Mn$ is expressed by the no load saturation curve OPK. For greater accuracy, this saturation curve should be plotted with a larger leakage factor, more nearly representative of full load conditions. The vector of the ampere turns of the armature reaction, $Ma=OH=FG$ is drawn parallel and opposite to $i$. The expression for $Ma$ is given in equation 64, page 130 of my book entitled "The Magnetic Circuit". The geometric sum of OF and OH gives the field ampere turns $Mf=OG$. This completes the familiar Potier diagram.

In order to use the movable scales of my calculating device to the best advantage, the triangles OAD and OHG in the device are combined into the cross hatched figure TDSLP. For this purpose, the triangle OAD is turned by 90 degrees into the position DSL so that point L is at the same distance from D as O and $DL=E$. The triangle OHG is simply transferred parallel to itself into the position TPD shown shaded. Since both SD and DT are parallel to the direction of the current vector $i$ and are proportional to it, they form a single line ST which can be used as a measure of the armature current. Since SL represents the voltage $e$ turned by 90 degrees, the angle at S formed by DS and the extension of LS is equal to $90° - \phi$. The area of the triangle DLS is proportional to the power delivered or used by the machine. If the machine operates at a constant voltage, the power is simply proportional to the normal distance of D from LS. Similarly, if the line LT be drawn, the area of the triangle LTD thus formed is also proportional to the power.

Let angle $AOC = \theta = \psi - \phi$ be the angle by which the field structure of a loaded synchronous machine leads or lags that of an unloaded machine with the same number of poles, the two machines working in parallel. This displacement angle $\theta$ is also equal to the angle between OG and a direction perpendicular to OA. Hence this displacement angle is also equal to the angle TNS and in this manner is measured by my calculating device. This diagram holds true for either a generator or a motor including a synchronous condenser and the angle $\phi$ may have any value between $+180°$ and $-180°$. When the operating conditions change, the line LD moves up or down, the point L remaining on the 45° line and point D on the OY axis. The shape of the triangle LDS also changes since at least one of the three quantities $e$, $i$ or $\phi$ changes. But LD is always horizontal and this is the basic principle of my calculating device. The segments SD and DT remain in phase with each other and their ratio constant. If the field current is kept constant, the length PT remains unchanged.

Comparing Figs. 1 and 3, it will be seen that the calculating device simply represents the cross-hatched part of Fig. 1 except that the saturation curve in Fig. 3 is plotted in the usual way to the right of the OY axis and the parts in Fig. 3 are an image of the lines of Fig. 1 with respect to the OY axis considered as a plane mirror.

Referring now to Fig. 2, the parts of the calculating device may be made of some such material as celluloid. Here the device is shown in a typical position on a no load saturation curve OPK. In this instance let us assume that the saturation curve is plotted in the metric system in percentages of rated voltage and rated field current, each unit representing one millimeter. The protractor scale 10 which is used for power factor settings is preferably marked directly in values of $\cos \phi$. The radial indicator 11 is pivoted at the centers of the protractor for locating on the protractor scale the direction of the vector of the armature current. A set screw 12 is provided which may be tightened when the arm 11 is at a desired setting after which the device is made to operate at a constant power factor. According to whether the synchronous machine is operating as a generator or a motor, the corresponding markings "lag" and "lead" must be used as marked on the protractor.

The terminal voltage scale 13 extends from the center of the protractor scale in line with one edge and is preferably made integral with the protractor scale. The terminal voltage scale is represented as being marked in centimeters although it might be marked directly in volts or in per cent of rated voltage. In any case its readings correspond to the voltage scale OY of the no load saturation curve. For example if 20 centimeters on the saturation curve gives the rated voltage of the machine, then this voltage is also represented on the scale 13 by 20 centimeters. The proportional dividers comprise the linked together members 14, 15, 16, 17 and 18 which are arranged so that the points ST, representative of the current vector, may be alined with the arm 11 and so that as the dividers are closed or opened, the point T stays in the line with the arm 11. By tightening the set screw at 19, the length ST becomes fixed and the performance of a machine may be studied at a constant current. In this device the vector of the terminal voltage represented by the scale 13 is turned by 90 degrees with respect to its true position in the Potier diagram, Fig. 1. For this reason when the vector ST is perpendicular to the voltage scale, the indicator arm 11 indicates the true power factor of 100 per cent. As will be hereinafter pointed out, the distance between the point S and the point U may be used to represent a reactive drop in series with the machine, for example that in a transformer, a voltage regulator, a current limiting reactor, a feeder, etc.

The bar 20 which is pivoted at T is the field excitation scale. This bar is provided with a centimeter scale and is used for measuring the field excitation of a loaded machine. If desired, this bar may also be calibrated to read directly in field amperes or the field ampere turns of a given machine. In any case, the scale is the same as that used for the abscissæ of the no load saturation curve.

In Fig. 3 I have represented a single line diagram of my calculating device upon which the quantities representative of the parts are indicated. Thus, the armature current $i$ is represented by ST, the reactive drop $ix$ by SD, the armature reaction $Ma$ by DT, the terminal voltage $e$ by SL, the induced voltage E by OD or DL, the field excitation $Mf$ by TP, etc.

When the distance SU is used to represent a reactive drop in series with the machine, the distance UL represents the line voltage beyond the reactance. The indicator SV gives the corresponding value of the power factor at the terminals of the machine. To measure the power factor between ST and UL, another protractor should be used, or else, the angle at VUL transferred to point S.

The distance SD is set knowing the leakage reactance $x$ of the machine. For example, if $ix$ is equal to 25% of the rated voltage at the rated current, and the voltage scale is 20 cm.=100% voltage, then at the rated current the opening SD must be 5 cm. To put it another way, in this particular machine ST represents the rated current when SD=5 cm. This gives the current scale. The current can be measured on a separate metric scale with an adjustable and a fixed slider whose pointers can be set at T and at S. Of course, the armature current can also be measured between any two other points of the proportional dividers, for example between S and D, U and T, etc. A circular scale with a pointer can be attached at U', the scale being so graduated that the reading would directly give the opening ST in cm.

Let the external reactance be $x_e$. Then the distance US must be such that for any opening of the proportional dividers $DS/SU = x/x_e$. Thus the bar UU' must be adjustable to fit a desired value of external reactance. In practice, however, it will be found simpler to have one setting only, say about 20% of the rated voltage at the rated current, and to find points for other values of reactance by applying a suitable scale. For example, if the actual reactance is only 12%, instead of 20%, use 12/20=60% of the length SU in each setting to locate the true point U.

The dimension, DT, must be such as to represent correctly the armature reaction of the machine to the same scale as the abscissæ of the no-load saturation curve. For example, let 10 cm. represent 100% field excitation and let the armature reaction at the rated armature current be 60% of the rated field excitation. Then DT must be equal to 6 cm. when SD=5 cm. In order to be able to use the same calculator with machines of different characteristics, it is thus necessary either to make the bar DD' adjustable, or else to plot the saturation curve of each machine to such a scale of abscissæ as to fit the available proportional dividers.

If the first alternative be selected, the bars 18 and 16, Fig. 2, are made longer and are provided with a large number of small holes. The bar 15 also has holes drilled in it. Small pins are placed in the proper holes to hold the bars together. By this means a proper ratio of SD to DT can be set for a machine of given constants. If the second alternative be chosen, the scale of the saturation curve is determined as follows: With the given proportional dividers let DT be equal to 7 cm. when SD=5 cm. Thus, in the machine used as an illustration above, 7 cm. must represent 60% of the rated excitation, and the scale of abscissæ for the no-load saturation curve is 7/0.6 cm. 11.67 cm.=100% excitation. By replotting the saturation curve to this scale, the proportional dividers will represent correctly the performance of this particular machine.

*Setting of the calculator.*

Before actually using the calculator device, it is necessary to do the following:

(a) Select the proper ratio of SD to DT (if point D is adjustable), or for a given SD, select such a scale of abscissæ that a fixed DT will represent the armature ampere turns correctly. The necessary instructions are given in the description of the proportional dividers above.

(b) Determine the scale for the armature current, by measuring the length ST or UT for a full-load setting of the proportional dividers.

(c) Replot the no-load saturation curve to the proper scale of abscissæ, if necessary.

(d) Draw the 45° line (OL in Fig. 3).

(e) If necessary, draw the power scale as hereinafter described.

After all this has been done, an arbitrary horizontal "operating line" is selected, such as DL, and the calculator is set on this line. Any horizontal line within the operating range of the saturation curve can be chosen as the first tentative operating line. The distance OD=DL represents the assumed induced voltage E of the machine. When properly set, the points D, P and L of the calculator lie on the chosen operating line and satisfy the following three conditions:

(f) Point D lies on the intersection of the chosen operating line with the axis of ordinates;

(g) The voltage scale SL passes through the intersection of the operating line with the 45° line;

(h) The field scale passes through the intersection of the operating line with the saturation curve.

With such a setting, all or some of the following readings can be taken which represent an actually possible operating condition of the machine:

The terminal voltage=SL
Induced voltage=DL
Line voltage beyond an external reactance, if any=UL
Armature current=ST (or UT)
Power factor at the machine terminals=V
Power factor beyond an external reactance, if any=sin /LUV
Field excitation=TP
Displacement angle $\theta$= /TNS
Power (as hereinafter described).

The displacement angle (in electrical degrees) is the angle between the pole structure of a loaded machine and of an identical machine running at no load on the same bus bars.

*One condition given.*—If no limiting operating conditions are given, an infinite number of settings on any operating line are possible. Suppose, however, that one out of the following four quantities is given:

Therminal voltage ($e$)
Armature current ($i$)
Power factor ($\cos \phi$)
Field current ($i_t$) (or field ampere turns $M_t$)

Then on a chosen operating line, for each value of one of the remaining three quantities, the other two become definite. In other words, such a limitation will give two curves for each operating line.

As an example, use the saturation curve given in Fig. 4 and choose the operating line 80—80. Set the calculator in such a way that the point D is on division 80 and the division 15 of the voltage scale is also on the point marked 80 on the 45° line. Assume that the terminal voltage is to be kept constant at 15 cm. and that the machine is to be operated at a constant induced voltage of 80%. Expand or contract the proportional dividers in steps and also change the power factor accordingly. It will be found that for each value of the armature current there are definite values of power factor and of field current, so that two curves can be plotted, $M_t$, vs. $i$, and $\cos \phi$ vs. $i$, with $e$ constant and E constant.

*Two conditions given.*—Let now two out of the four above named quantities be given. Then on a chosen operating line there is only one possible setting which satisfies these conditions. The operator can check this by trying again the above setting with the additional requirement that the field current must be equal to say 9 cm., or as another example, that the power factor remain constant at 80%. By shifting the calculator from one operating line to another, a curve can be plotted between the remaining two quantities. For example if the terminal voltage and the power factor are given, one can find the corresponding values of armature current and field current for various operating lines and plot a curve of $i$ vs. $M_t$.

*Three conditions given.*—When three out of the foregoing four quantities are given, the calculator can be set properly only on one operating line. To find this line and to determine the setting, begin with a high operating line and gradually shift the device down, until a setting is found for which the three given conditions are satisfied.

The foregoing combinations do not exhaust various practical problems. For example, power or kva. may be required to be kept constant; the stable and the unstable regions of operation determined, etc.

The foregoing instructions are sufficient for a proper individual setting of the device. As to the simplest sequence of such settings in a given problem, this must be left to the experience, ingenuity and judgment of the user. In this respect, the calculator is not different from the slide rule or any other computing device.

*General discussion of the scales.*

While the setting of the proportional dividers is explained on an example above, it is deemed advisable to give a general theory of the scales to be used with the calculator to cover all possible conditions. The following notation is used below:

$a$ rated voltage in cm.
$b$ rated field excitation in cm.
$c$ rated armature current in cm. (the length ST).
$E_o$ nominal voltage in cm.
$m$ ratio of DT to SD.
$n$ ratio of the short circuit current (at the rated excitation) to the rated current of the machine.
X reactance drop at the rated current, expressed as a fraction of the rated voltage.
$y$ the length DT at the rated current in cm.
$z$ the length SD at the rated current in cm.

From this notation, we immediately get the following three equations:

$$z = aX \quad (1)$$
$$y/z = m \quad (2)$$
$$y + z = c \quad (3)$$

The nominal voltage $E_o$ is defined as the electromotive force which would be induced at the rated field current and at no-load, if the saturation curve were continued as a straight line through the origin.

An additional relationship can be obtained from Fig. 5 which represents the no-load saturation curve of a machine. If $OF = b$ is the rated excitation in cm., then the armature reaction in cm. on short circuit is $ny$ cm. This leaves the net excitation equal to OG, which induces a voltage GB. This voltage is used up in the reactive drop $nX$. Measured in cm., this drop is equal to $nXa$. From the similar triangles OAB and OCD, we have, $$nXa/(b - ny) = E_o/b \quad (4)$$

Equations (1) to (4) represent the necessary relationships among the quantities and scales concerned. Usually either $b$ or $y$ is unknown. Solving equation (4) for both, we get:

$$y = [1 - (nXa/E_o)](b/n) \quad (5)$$
$$b = (ny)/[1 - (nXa/E_o)] \quad (6)$$

*Example 1.*—Let the no-load saturation curve be plotted to such scales that $a = 20$ cm. and $b = 10$ cm.; $E_o = 24$ cm. The reactance drop is 30% and the short-circuit current is 1.3 times the rated current. Find ($m$) and ($c$).

*Solution.*—From equation (5) we get, $y = [1 - 1.3 \times 0.30 \times 20/24](10/1.3) = 5.19$ cm.

Equation (1) gives $z = 20 \times 0.3 = 6$ cm.; and from equation (2), $m = 5.19/6 = 0.865$. Equation (3) gives $c = 5.19 + 6 = 11.19$ cm.

*Example 2.*—Referring to the preceding example, let the ratio $(m)$ for the available dividers be 1.2. Determine $(b)$ and $(c)$.

*Solution.*—The value of $(z)$ is the same as before, so that $y = 1.2 \times 6 = 7.2$ cm. Hence, $c = 7.2 + 6 = 13.2$ cm. From equation (6) we find, $b = (1.3 \times 7.2)/[1 - 1.3 \times 0.3 \times 20/24] = 13.85$ cm.

The same value of $(b)$ could be obtained from the proportion, $b/10 = 7.2/5.19$.

*Operation on short-circuit and at zero power factor.*

Three typical positions of the calculator, with the machine operating at zero power factor, are shown in Fig. 6. The five characteristic points of the calculator are denoted by the same letters as in Fig. 3. Because of zero power factor, all these five points in each setting lie on the same operating line.

(a) The operating line, $T_oL_o$, corresponds to operation on short-circuit. The points $S_o$ and $L_o$ coincide since $e_o = 0$, and both lie on the 45° line. The difference $D_oP_o$ between the field excitation $M_f$ and the armature reaction $M_a$ is just sufficient to induce the electromotive force $OD_o = D_oL_o$ which equals the reactive drop $ix$.

(b) The operating line $T_1L_1$ shows the machine operating at zero power factor with the field $M_f$ over-excited. The armature current is the same as on short-circuit, so that the length $D_1S_1 = D_oS_o$ and $D_oT_o = D_1T_1$. Because of a higher field excitation the net excitation $D_1P_1$ is not only sufficient to overcome the $(ix)$ drop, but leaves a terminal voltage $S_1L_1 = e_1$. Such an operating condition arises in two cases, viz (1) when a generator is loaded on pure reactances and (2) when a synchronous motor operates at no load over-excited (synchronous condenser).

(c) The operating line $S_2L_2$ shows a machine operating at zero power factor under-excited. The armature current is the same as before, so that $D_2S_2 = D_1S_1$ and $D_2T_2 = D_1T_1$. In spite of a small excitation, $T_2P_2$, the terminal voltage, $S_2L_2 = e_2$, is quite large. This is because the armature reaction $M_a$ now acts in the same direction as the field magnetomotive force, strengthening it. Such an operating condition arises in two cases, viz, (1) when a generator is connected to a pure capacitance, say, an unloaded transmission line, and (2) when a synchronous motor operates at no load under-excited, drawing a lagging reactive current from the line (synchronous reactor).

It will thus be seen that the calculator enables one to investigate these special operating conditions as well as the behaviour of a synchronous machine under ordinary load.

*The power scale.*—For any setting of the calculator, the terminal voltage $e$ (Fig. 3), the current $i$ and the power factor cos $\phi$, can be read off and the power can be computed according to the familiar formula:

$$P = ei \cos \phi \sqrt{3} \quad (7)$$

However, in some problems it may be desirable to read the power directly on a scale, for example, when it is required to keep the power constant. Such a scale is shown in Fig. 7. This figure represents the axis OY of the no-load saturation curve, same as in Fig. 3, and also the points D and T of the calculator. In order to construct and to use a power scale, proceed as follows:

(a) At a distance $k$ from OY, select a parallel line AB, and for several values of induced voltage E compute the length $h$ from the formula, $$h = N/E \quad (8)$$

where the constant N is computed from the equation, $$N = (kay)/p \quad (9)$$

In these equations,

E is the distance of the chosen operating line from the origin (O), in cm.

$a$ is the rated voltage, in cm.

$y$ is the opening (DT) of the proportional dividers for the rated current, in cm.

$p$ is the rated $kv$—$a$ of the machine on the power scale, in cm.

The values of $k$ and $p$ are arbitrary and must be decided upon by the user of the device, keeping in mind the available space on the curve sheet and the desired accuracy of the results.

(b) Having computed the values of $h$ for various values of E, lay them off to form a new non-uniform scale on AB. For example, if a chosen value of E is 24 cm., project D on AB; this will give point C; lay off $h$ from C upward to H. Mark H as point 24 and connect D and H by a straight line. Draw such lines for various values of E within the operating range of the machine.

(c) Let TD be a setting of the calculator for which it is desired to find the value of the power. Since point D is on the operating line 24, mentally find the intersection of the horizontal line through T with DH. Let this be at a point F. The distance $q = FG$, is proportional to the power and can be read off on the scale, $fg$, in cm. To convert into kilowatts, remember that the rated $kv$—$a$ of the machine is represented by $p$ cm. For example, if the rating of the machine is 1350 $kv$—$a$, it is convenient to select $p = 13.5$ cm. Then each cm. on the scale will correspond to 100 kw.

*Proof.*—The opening TD of the proportional dividers is proportional to the current of the machine. GD=$s$, is the component of the current in phase with the induced voltage E, so that the product E$s$ is proportional to the power of the machine. Since the ohmic drop in the armature is neglected, the product E$s$ is exactly the same as $ei \cos \phi$. The ratio E/$a$ shows how many times E is greater or smaller than the rated voltage. Similarly, the ratio $s/y$ indicates how many times the in-phase component of the current is greater or smaller than the rated current of the machine. Hence, the expression E/$a$ $s/y$ is equal to the ratio between the actual power at the given setting and the rated $kv$—$a$ of the machine. But, the same ratio is also equal to $q/p$. Hence, $$q/p = (E/a)(s/y) \quad (10)$$

From the similar triangles DCH and DGF, we have $$k/h = q/s \quad (11)$$

Multiplying equations (10) and (11), term by term, and cancelling $q$ and $s$, equations (8) and (9) are obtained.

*A reactance or a capacitance shunted across the terminals of the machine.*

For the purpose of voltage regulation, power factor correction, etc., a reactance or a condenser (static or synchronous) may be connected across the terminals of a synchronous machine, operating either as a generator or as a motor. The effect of such a condition upon the setting of the calculator is shown in Fig. 8, the lettering being the same as in Fig. 3. The line T″T‴ is drawn parallel to the direction of the terminal voltage SL. Hence, a component of the current in the direction T″T‴ is purely reactive, because in the calculator the vector SL of terminal voltage is turned by 90° with respect to its true position. Let the machine be operating as a generator, with the current equal to ST and the power factor read off at V. If now a reactive coil be connected across the terminals, consuming say a current equal to T‴T, then the line current will be ST″ and the power factor will be read off at V″. If a condenser be connected across the generator terminals, consuming a leading current, T″T, then the line current will be ST′ and the power factor will be read off at V′. Similar relations obtain for a synchronous motor.

Conversely, if the line current and the line voltage are given, so that the point T′ or T″ is known, the current ST in the armature of the machine can be found by drawing T″T‴ parallel to SL. Then the calculator can be set for the true current ST in the machine.

I do not wish to be limited to the particular construction and arrangement of the calculating device as hereinbefore described since it will occur to those skilled in the art that other modifications and arrangements employing the same general underlying theory may be used to carry out the invention, but seek to cover in the appended claims all modifications coming fairly within the true spirit and scope of my invention.

What I claim as new and desire to secure by Letters Patent of the United States, is:

1. A calculating device for determining characteristics of synchronous alternating current machines, comprising a protractor scale graduated in terms representative of power factor, an indicating arm movable about the center of said protractor, a proportionate divider associated with said protractor and arranged so as to obtain adjustable points spaced away from the center of said protractor and in alinement with said indicating arm at distances representative of armature current and reactive drop respectively, and a scale having graduations representative of voltage extending from the center of said protractor along one edge thereof.

2. A calculator as claimed in claim 1, characterized by the provision of a scale calibrated in terms representative of field excitation pivoted at the point of the proportionate divider which is representative of armature current.

3. A calculator for determining characteristics of synchronous alternating current machines comprising an 180° protractor scale graduated in terms representative of lagging and leading power factors, a scale extending from the center of said protractor along one edge thereof graduated in terms representative of voltage, an indicator arm pivoted at the center of said protractor and cooperating with the scale thereof, and a proportionate divider secured to said arm and arranged to obtain adjustable joints spaced away from the center of said protractor and in alinement with said arm at distances representative of armature current and reactive drop respectively.

4. A calculator as claimed in claim 3, characterized by the fact that the proportionate divider is adjustable along the indicator arm for the purpose of setting the calculator for different values of armature current and reactive drop respectively while maintaining the representative points in alinement with said arm.

5. A calculating device for determining characteristics of synchronous alternating current machines comprising a protractor having a scale graduated in units representative of power factor, a voltage scale extending from the center of said protractor through a zero power factor graduation thereof, a power factor indicator arm pivoted at the center of said protractor, and a proportionate divider secured to said arm and arranged to obtain points spaced away from the center of said protractor in alinement with said arm at distances representative of armature current and reactive drop respectively, said divider being adjustable to obtain different proportional settings of the points representative of armature current and reactive drop.

In witness whereof, I have hereunto set my hand this 24th day of October 1924.

VLADIMIR KARAPETOFF.